United States Patent [19]
Clites et al.

[11] 3,775,091

[45] Nov. 27, 1973

[54] INDUCTION MELTING OF METALS IN COLD, SELF-LINED CRUCIBLES

[75] Inventors: Philip G. Clites, Silverton; Robert A. Beall, Albany, both of Oreg.

[73] Assignee: The United States of America as represented by the Secretary of the Interior, Washington, D.C.

[22] Filed: Feb. 27, 1969

[21] Appl. No.: 802,805

[52] U.S. Cl. .................................. 75/65, 75/10
[51] Int. Cl. ...................... C22b 53/00, C22d 7/08
[58] Field of Search ............... 75/10, 65, 84, 94, 75/95, 96; 164/68

[56] References Cited
UNITED STATES PATENTS

| | | | |
|---|---|---|---|
| 2,805,148 | 9/1957 | DeLong | 75/10 R |
| 2,908,739 | 10/1959 | Rummel | 75/10 R |
| 3,005,246 | 10/1961 | Murphy | 75/10 R |
| 3,160,497 | 12/1964 | Loung | 75/10 R |
| 3,206,301 | 9/1965 | Daubersy | 75/49 |
| 3,318,363 | 5/1967 | Goss | 164/82 |
| 2,686,946 | 8/1954 | Jackson | 75/84 |
| 2,871,533 | 2/1959 | Swainson | 75/10 |
| 3,223,519 | 12/1965 | Schippert | 75/10 |
| 3,417,808 | 12/1968 | Rosenberg | 164/68 |
| 3,476,171 | 11/1969 | Stark | 75/10 |
| 3,493,363 | 2/1970 | Ahearn | 75/94 |

FOREIGN PATENTS OR APPLICATIONS

| | | | |
|---|---|---|---|
| 518,499 | 11/1926 | Germany | 75/10 |
| 808,843 | 2/1959 | Great Britain | 75/96 |

OTHER PUBLICATIONS

Induction Heating Process for Melting Titanium (Cold-Wall Crucibles, Segmented and Non-Segmented), Technical Documentary Report No. ML TDR 64–209 (1964) (D.D.C. No. AD–449, 372)

*Primary Examiner*—L. Dewayne Rutledge
*Assistant Examiner*—Peter D. Rosenberg
*Attorney*—Ernest S. Cohen

[57] ABSTRACT

Metals such as titanium and zirconium are melted and formed by induction heating within a cold segmented metal crucible having a self-generating and self-renewing insulating lining.

11 Claims, 3 Drawing Figures

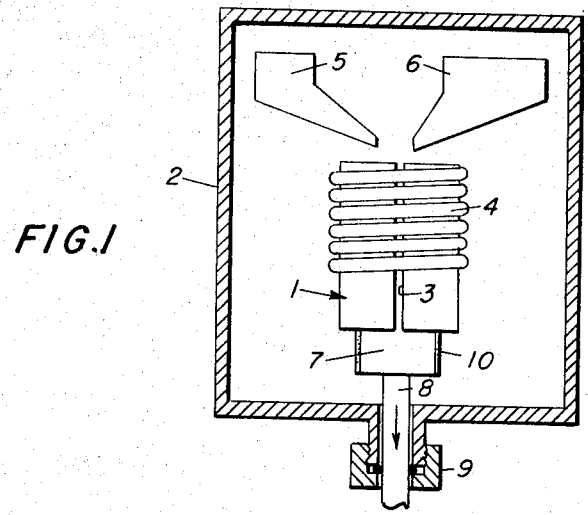
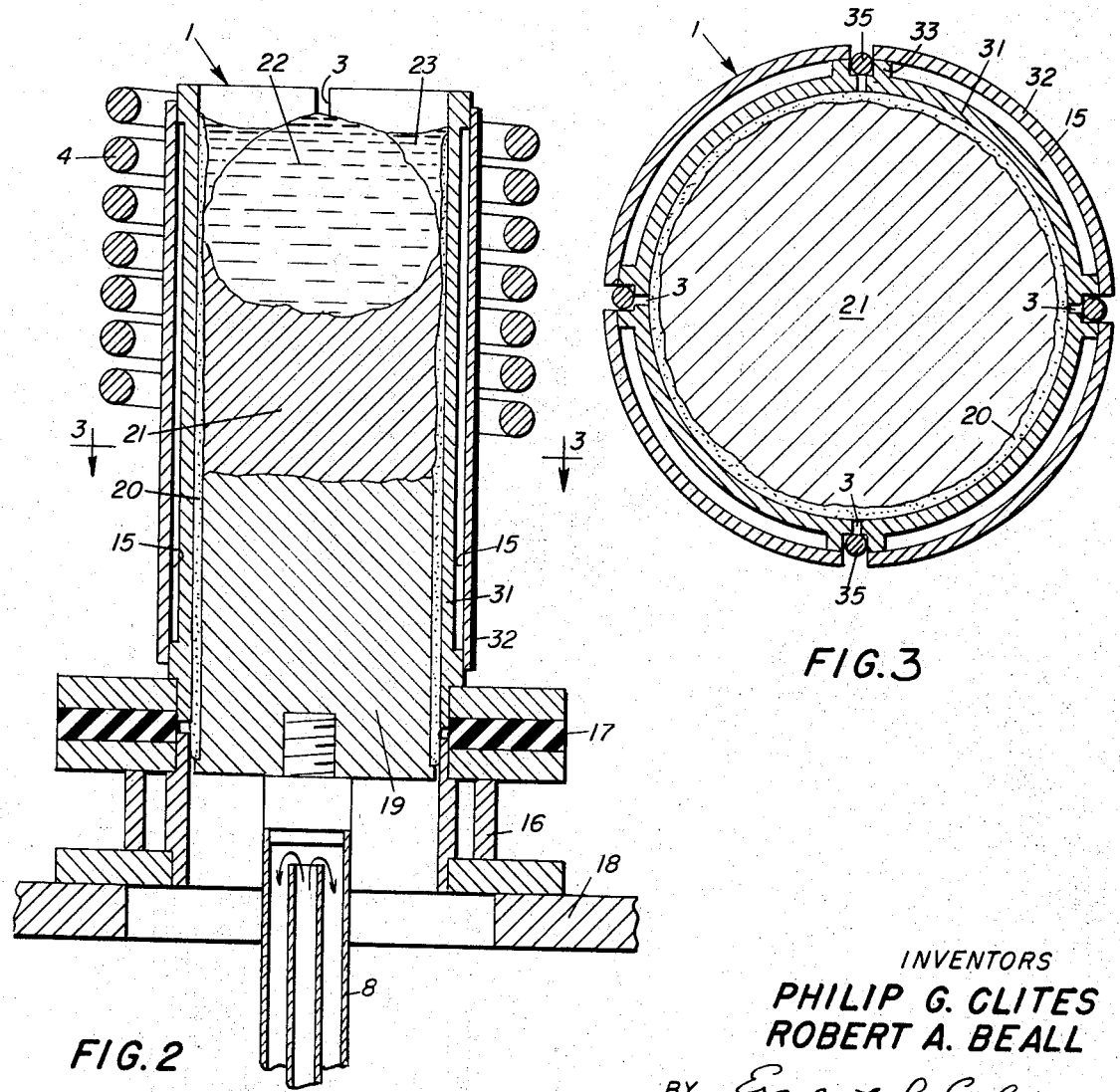

INDUCTION MELTING OF METALS IN COLD, SELF-LINED CRUCIBLES

BACKGROUND OF THE INVENTION

Reactive metals having high melting points such as titanium, zirconium and the like, are now conventionally melted and formed using cold crucibles. Such crucibles are typically constructed of a metal having a high heat conductivity such as copper and are generally cooled by circulating water. Exemplary processes which have been developed on an industrial scale using water-cooled crucibles include vacuum-arc melting, Hopkins' Process or electro-slag melting and electron-beam melting. All of these processes have inherent disadvantages. Electron beam melting is expensive and requires the maintenance of a relatively high vacuum. Both consumable-electrode arc melting and Hopkins' Process require fabrication of a consumable electrode and in many cases provide poor control of melting rates.

The advantages of a process utilizing induction heating have long been recognized and many attempts have been made to utilize this technique in the melting of reactive and refractory metals. Of these many attempts, none has provided a satisfactory method for melting these metals on an industrial scale. Attempts to melt refractory metals using induction heating date back at least to 1926 as is shown by German Pat. No. 518,499. This patent proposed the use of a water-cooled, metal crucible having high heat conductivity. Copper and silver were recommended as being especially suitable. The crucible was constructed of segments electrically insulated from each other by materials such as mica in order to prevent undue attenuation of the magnetic flux applied by an induction coil encircling the crucible. The patent states that tantalum, tungsten and thorium can be melted in an amount of several kilograms using this technique.

A similar process and apparatus developed by Schippereit (U.S. Pat. No. 3,223,519) has probably come closest to achieving the desired results. His system was successful on small-scale equipment but attempts to utilize his technique in large crucibles resulted in molten metal shorting across the crucible segments causing melting of portions of the copper crucible. Attempts to use an oxide coating, such as beryllium oxide, on the interior crucible surface as was proposed in the German patent were also unsuccessful.

SUMMARY OF THE INVENTION

It has now been found that the difficulties associated with the prior processes and apparatus may be overcome in an extremely simple manner. Use of a slag or fluxing agent in association with the metal charge produces a self-generating and self-renewing insulating material between the crucible segments and provides a liner for the interior crucible surface.

Hence it is an object of this invention to provide an apparatus and process for the inductive melting and forming of reactive metals.

Another object of this invention is to provide a self-generating insulating lining for a cooled metal crucible used in the induction melting of metals.

A specific object of this invention is to provide a process for the induction melting and forming of titanium and other high-melting metals and their alloys.

DETAILED DESCRIPTION OF THE INVENTION

Exemplary embodiments of the invention will now be described with reference to the accompanying drawings, wherein:

FIG. 1 is a diagrammatic partial section of an apparatus for the continuous melting and solidification of refractory metals and other materials.

FIG. 2 is a longitudinal cross-sectional view of the crucible employed in the apparatus of FIG. 1 illustrating construction details and charge distribution during operation of the apparatus.

FIG. 3 is a cross-section taken along line 3—3 of FIG. 2.

The apparatus illustrated in FIG. 1 depicts a preferred embodiment for the continuous production of an ingot within a controlled composition atmosphere or vacuum environment. Crucible 1 is contained within a housing or chamber 2 constructed in such a manner as to be gas-tight. Crucible 1 is preferably constructed of a metal having high heat conductivity such as copper. The crucible is split longitudinally by at least one slit 3 so as to reduce the attenuation or shielding action which would be presented by an electrically continuous crucible. Also provided is a cooling jacket for the crucible (not shown) which preferably comprises an integral part of the crucible.

Coaxially disposed around the top of the crucible is work coil 4 which in turn is connected to a conventional power source (not shown) providing an electric induction current to the work coil. The work coil is provided with cooling means and preferably comprises copper tubing having a cooling medium flowing therethrough.

Disposed generally above and discharging into the open top of crucible 1 are material feeders 5 and 6. These feeders are of any conventional type capable of the controlled discharge of granular or particulate solids within a vacuum or controlled environment atmosphere. Feeder 5 controls the discharge of a slag material into the crucible while feeder 6 discharges controlled amounts of particulate ingot-forming material such as titanium sponge.

Extending from the bottom of the crucible is shown a formed ingot portion 7 attached to a control rod 8. The control rod is used to adjust the level of ingot 7 within the crucible and to continuously withdraw the ingot as it is formed. In the embodiment illustrated, the control rod passes through the bottom of chamber 2 by means of gas seal 9. Encrusting the outer surfaces of ingot 7 is a frozen slag layer 10.

Referring now to FIG. 2, there is shown a longitudinal sectional view of the crucible. As illustrated, crucible 1 is divided into multiple segments by means of slits 3. Each crucible segment is provided with an integral coolant channel 15 through which a fluid such as water is continuously circulated during operation. The crucible segments are mounted in electrical isolation from each other on a non-segmented lower crucible section 16. Electrical isolation of each crucible segment may be conveniently accomplished by providing insulating member 17 between each segment and the lower crucible section. Attachment of the segments to the lower section may be by use of insulated bolts (not shown) or any other convenient method. The lower section in turn is attached to bracket member 18 for mounting within the vacuum chamber.

To begin a melting and ingot-forming operation, a starting stub 19 attached to a control rod 8 is placed within the lower part of the crucible. The control rod may comprise two annularly disposed pipes as shown for the circulation of coolant and may be attached to the starting stub in any convenient manner. An initial melting charge consisting of the metal to be melted together with a quantity of slag material is then placed on top of the starting stub within the area encircled by the work coil 4. The starting stub is preferably of identical composition with the material to be melted.

Power is then applied to the work coil and the initial charge is heated. As heating progresses the slag melts, running down and solidifying in the annular area between the starting stub and the crucible wall. A thin layer of slag 20 also freezes on the cold crucible wall thus providing both heat and electrical insulation between the cold crucible and the hot metal charge. Continued heating melts the initial charge of metal and the top portion of the starting stub thus welding the two together to form a solidified ingot portion 21. A molten pool of metal 22 surmounts the solidified ingot and is surrounded by slag 23.

During operation, levitating forces induced by the electrical field distort the molten metal pool into the general shape shown. Buoyant forces exerted by molten slag surrounding the metal probably contribute to the levitating effect. Solid metal is added to the molten pool as fast as it can be melted and assimilated by the pool. The formed ingot is withdrawn from the bottom part of the crucible at a rate such that the level of molten metal and slag remains constant. Slag is added, either intermittently or continuously, to make up that carried out of the heating zone as a coating on the ingot.

Turning now to FIG. 3, there is shown a cross-sectional view of the crucible taken generally along the line 3—3 of FIG. 2. The crucible 1 is divided into four equal segments by means of longitudinal slits 3. Each crucible segment is made up of an inner wall member 31 and an outer wall member 32 which together with spacing members 33 define a coolant channel 15. In a preferred embodiment, spacing members 33 and outer wall member 32 are offset circumferentially relative to the edge of inner wall member 31 to form a flanged recess as is shown in the drawing. Within the longitudinal recess may be placed an insulating spacer member 35 which may comprise a tubular or rod-like ceramic member. An alumina thermocouple insulator was found to be completely satisfactory for the purpose. Spacer member 35 need not seal slit 3 but acts to keep the segments in physical alignment and provides a physical barrier to the unimpeded flow of molten slag through the slits before the slag has had time to freeze.

Positioned within the crucible is a solid ingot 21 formed during the melting operation. Completely surrounding the ingot and separating it from physical or electrical contact with the crucible is a solidified slag layer 20. This slag layer extends within slits 3 thus aiding the maintenance of electrical isolation between adjacent segments.

The process and apparatus may be used for the melting of a wide variety of materials including the common commercial metals when economic considerations justify its use. The process and apparatus, however, is particularly applicable to the melting and forming of titanium, zirconium, hafnium and alloys of those with other metals.

Fluxes or slags suitable for use in the process include any materials which fulfill the following requirements: (1) The slag must be an electrical insulator in its solid form. (2) It should have a fairly high melting point but its melting point must be significantly lower than that of the metal being processed. (3) It must be non-reactive toward and insoluble in the molten metal being processed. (4) The slag must be at least relatively stable at the temperatures used in the process, and (5) it desirably has a low volatility at process temperatures. Obviously choice of a suitable slag is highly dependent upon the metal being processed. The alkali and alkaline earth metal fluorides, and especially calcium fluoride, have been found to be excellent slag materials when melting such metals as titanium, zirconium and their alloys.

It has been found that any physical form of the metal which is capable of being introduced into the melting crucible at a controlled rate is amenable to treatment by the process. Physical forms of metal successfully melted and formed by the process include cast rod stock, pressed and compacted sponge rods, metallic sponge such as that produced by the Kroll process and particulate scrap of varying size and shape. Slag requirements vary depending upon the crucible size, slag composition and metal being processed. Generally slag requirements will range from about 2 to about 20 percent by weight of the metal processed. Some of the slag may be recovered and reused in the process.

It is necessary that the melting and forming of reactive metals such as titanium be performed either under vacuum or in an inert gas atmosphere. Inert gases such as argon or helium are satisfactory as a protective atmosphere. While process pressure may range from high vacuum to superatmospheric, it is generally preferred to operate the process at subatmospheric pressures. In the melting of titanium using a calcium fluoride slag, for example, it was found that operation at about ⅓ atm using helium as the inert gas provided satisfactory operation and substantially reduced slag volatilization. Common commercial metals such as iron and nickel base alloys could be melted without any atmosphere control beyond the slag cover, as is the general practice with the Hopkins process.

The following examples will demonstrate in greater detail specific embodiments of the invention:

EXAMPLE 1

A series of preliminary tests were performed to investigate the action of fluxing materials during the heating of a metal charge in a cold crucible. A water-cooled split copper crucible having a single longitudinal slit was constructed. A cylinder of mild steel was placed within the crucible together with a charge of solid calcium fluoride. The steel cylinder had a diameter slightly less than the inside diameter of the crucible. Inductive heating of the cylinder was then commenced. As the steel heated, calcium fluoride in contact with the cylinder was melted. With continued heating, the entire charge of calcium fluoride melted and formed a cover of molten slag. As had been theorized, a thin layer of slag solidified against the cold wall of the crucible thus completely insulating the crucible from the heated metal.

All tests were conducted in an open environment without a protective atmosphere. Observations of the heating pattern during these tests showed that heating was most intense near the longitudinal slit. These tests also confirmed that heating was longitudinally concentrated at the center of the work coil.

EXAMPLE 2

A crucible, such as that illustrated in FIG. 2, was constructed. This crucible had 4 longitudinal slits dividing the crucible body into 4 segments. Inside diameter of the crucible was 3-½ inches and length of the segmented section was 8-½ inches. The crucible segments were bolted to a non-segmented lower section also having an inside diameter of 3½ inches. Alumina thermocouple insulators were used as spacing members between segments. Each crucible segment was insulated from the lower section by means of a Micarta ring.

A work coil consisting of 7 turns of ½ inch heavy-walled copper tubing was placed coaxially around the upper portion of the crucible. In this way, melting occurred in the upper part of the crucible while cooling and solidification took place in the lower part. Power for inductively heating and melting was supplied by a 10 kc motor-generator rated at 75 kw. The entire crucible assembly was then installed within a vacuum chamber. A single-stage blower connected in series with a mechanical pump was used to evacuate the chamber. Side feeding units were also installed for adding slag and metal to the crucible.

A general procedure for melting metals was established as follows: First, a starting stub consisting of a cylinder of the metal to be melted is placed within the lower portion of the crucible. Diameter of the stub must be slightly less than the inside diameter of the crucible in order to avoid shorting out the crucible segments. The top of the stub is located generally at the bottom of the work coil. Next, an initial charge of the metal to be melted together with a quantity of slag is placed within the crucible on top of the stub.

Power is then applied to the work coil resulting in the heating of the metal charge. As heating proceeds, the slag is first melted forming a solid insulating lining on the interior of the crucible and within the longitudinal slits. Heating is continued to form a molten pool of metal essentially covered and surrounded by molten slag. As soon as a molten pool of metal is established, feeding of metal into the pool is commenced. As material is added to the pool, the resulting ingot is withdrawn through the bottom of the crucible.

EXAMPLE 3

Using the apparatus and general procedure set out in Example 2, a titanium metal charge was melted. The starting stub was a 5-inch length of titanium rod having a diameter of 3-¼ inches. Attached to the stub was a water-cooled control rod extending through the bottom of the vacuum chamber. The control rod was used to adjust the level of the ingot in the crucible and to withdraw the ingot as it formed. An initial charge consisting of vacuum distilled titanium metal sponge and granular calcium fluoride was added to the crucible on top of the stub. The chamber was then evacuated and back-filled with helium to approximately ⅛ atm. pressure.

Power was then supplied to the work coil at a rate of about 30 kw for the first 2 to 3 minutes until the slag had melted and formed an insulating coating on the crucible and until the original metal charge had formed a molten pool. Power level was then increased to 45 to 50 kw and feeding of titanium sponge was commenced. Sponge was dropped into the molten pool from the outlet of a side feeder located 11 inches above the top of the crucible. Rate of sponge addition was limited by the rate at which sponge was melted and assimilated by the molten pool. Make-up slag was added as the slag cover was depleted by solidification of a slag layer on the outer surface of the ingot.

As metal was added, the ingot was withdrawn to maintain a constant level of the ingot within the pool. Feeding of sponge continued until the supply within the side feeder was exhausted. The melting rate was 0.44 pounds per minute and power consumption was 1.7 kwh per pound. At the conclusion of the run, power to the work coil was terminated, the ingot was allowed to cool and was then removed from the crucible. The cooled ingot had a continuous calcium fluoride coating on the order of 1/16 inch thick. Surface quality of the ingot was good.

Observations during the run indicated that levitating forces acting on the molten metal coupled with buoyancy exerted by the molten slag caused a part of the molten metal pool to be lifted above the surface of the slag. Field strength was most intense at the crucible slits as was shown by the fact that metal adjacent to the slits was forced inward. When viewed from above, molten metal protruding above the molten slag had the shape of a four-pointed star; the points being located midway between slits. Since molten calcium fluoride is a good electrical conductor, there was some question as to whether it was heated by induced current flow within the slag. Absence of any visible levitation of the slag indicated that at least most of the slag heating was by conduction from the metal.

EXAMPLE 4

Another run was made using the same equipment and general procedure set out in Example 2. Instead of vacuum distilled titanium sponge, leached and dried titanium sponge was used as the initial charge and feed material. It had been expected that this sponge would be more difficult to melt than the vacuum distilled sponge. No difficulties were encountered although the melting rate was somewhat lower than that achieved in Example 3 and the sidewalls of the produced ingot were rougher. Overall melting rate was 0.32 pounds per minute at a power consumption of 2.3 kwh per pound.

EXAMPLE 5

The procedure of Example 2 was repeated using yet another type of feed material in order to determine the utility of the process for reclaiming scrap. Solid titanium parts including broken tensile specimens, chopped sheet and sections of ingots were used as the original crucible charge. No difficulties were experienced in melting the material. There were difficulties in feeding the scrap material, however, due to the fact that the side feeder was not well adapted to dispensing the varied sizes and shapes of the scrap. Pieces of scrap weighing as much as 15 g were dropped into the molten pool from a height of 11 inches with virtually no splashing of metal. The resulting ingot was of excellent quality.

EXAMPLE 6

Additional runs were made using consumable titanium feed rods as the starting charge. Feed material was in the form of pressed sponge compacts and swaged rods of previously melted titanium. The feed rod was introduced from the top of the crucible and was fed downwardly until its lower end was submerged in the slag. As metal at the end of the feed rod melted and transferred to the pool of molten metal in the crucible, the feed rod was progressively lowered while the ingot was withdrawn from the pool. Quality of the resulting ingots were excellent.

EXAMPLE 7

One attractive application of this process would be to induction melt titanium sponge to form an ingot for use as a consumable electrode for vacuum-arc remelting into a final ingot. Induction melting and forming would eliminate the pressing and welding operations required to produce a first-melt electrode for vacuum-arc melting and would also constitute the initial melting step.

Induction-melted ingots prepared from all varieties of starting materials illustrated in the previous examples were found to be satisfactory as electrode stock. No machining of the outer electrode surface was necessary. Due only to the limited capacity of the experimental furnace, it was necessary to weld several ingots together to form an electrode of suitable length for vacuum-arc remelting.

Ingots formed by vacuum-arc remelting of induction-melted electrodes were of excellent quality. Impurity content of such ingots were compared to the impurity content of a standard vacuum-arc remelt of the same lot of titanium sponge. Ingots melted by induction melting contained a slight fluorine contamination and ingots from sponge with a high hydrogen content were higher in hydrogen than standard vacuum arc melted ingots. Other impurities in induction-melted ingots were at a level comparable to vacuum arc melted ingots.

EXAMPLE 8

A run was attempted without the use of slag. The apparatus and techniques used were otherwise unchanged from those employed in the preceding examples. For this run, the usual initial charge of titanium was placed in the crucible and provisions were made to side feed vacuum distilled sponge into the crucible as melting progressed. The chamber was backfilled to ⅓ atm of helium and heating was initiated.

As soon as a pool of molten metal formed, it ran against the sides of the crucible causing an immediate decrease in the heating rate. It was thereafter impossible to maintain a full pool of molten metal. Titanium sponge added to the crucible by side feeding did not completely melt.

The crucible was then allowed to cool and the ingot was removed. Upon inspection of the crucible, evidence of arcing between adjacent segments was noted. Melted metal had run into the crucible slits causing arcing between adjacent segments and resultant damage to the crucible walls.

The crucibles used in the experimental work were of circular cross-section and ingots produced by the process conformed to that shape. Other crucible shapes may be used, however, to produce ingots of different cross-section.

As has been demonstrated in the examples, this process has capabilities not present in any other known method of melting and forming ingots. Specifically, no other process is capable of handling the variety of physical forms of feed metal to produce ingots on a continuous or semi-continuous basis.

What is claimed is:

1. A coreless induction furnace for the melting and forming of metals which comprises a hollow, elongated, electrically isolated metal crucible open at the top and bottom and of uniform cross-section throughout the length thereof and having crucible sidewalls divided by longitudinal slits into at least two segments, each segment being maintained in electrical isolation from every other segment, means for cooling the metal crucible, means for inducing an alternating electric current within a metal charge contained in the crucible and means for continuously generating and maintaining an insulating lining on the inner surface of the crucible and within the longitudinally extending slit said insulating lining comprising a metallic compound having electrical insulating properties when solid and having a melting point below that of the metal to be melted and formed within the crucible.

2. The apparatus of claim 1 wherein the insulating lining comprises an alkaline earth metal fluoride.

3. A process for melting and forming metals which comprises:
   a. placing an initial solid charge of a metal chosen from the group consisting of iron and nickel base alloys, titanium, zirconium, hafnium and their alloys, together with a slagging material, said material comprising a metallic compound having electrical insulating properties when solid and having a melting point below that of the metal charge, within a metallic crucible open at the top and bottom and of uniform cross-section throughout the length thereof and having sidewalls divided by longitudinal slits into at least two segments, each segment being maintained in electrical isolation from every other segment;
   b. establishing a pool of molten slag and metal within the crucible by applying an alternating electrical flux supplied by a primary induction coil surrounding an upper portion of the crucible;
   c. maintaining the temperature within a lower portion of the crucible at a temperature substantially less than that of the upper portion;
   d. continuously cooling the crucible to form and maintain a frozen slag lining on the interior surfaces of the crucible and filling the longitudinal slit, and
   e. adding additional solid metal to the molten pool to be melted and assimilated therein.

4. The process of claim 3 wherein the pool of molten slag and metal within the crucible is established on top of a metallic starting stub positioned within the lower portion of the crucible and wherein the starting stub is withdrawn at a rate substantially equal to the rate of addition of solid metal to the molten pool to continuously form an ingot conforming to the cross-sectional shape of the crucible.

5. The process of claim 4 wherein the cross-sectional shape of the crucible is circular.

6. The process of claim 4 wherein the initial metal charge and additional solid metal is chosen from the group consisting of titanium, zirconium, hafnium, and their alloys.

7. The process of claim 6 wherein the metal is titanium and wherein the slagging material comprises an alkaline earth metal fluoride.

8. The process of claim 7 wherein the slagging material comprises calcium fluoride.

9. The process of claim 6 wherein the melting and forming of a refractory metal is performed in a non-reactive environment.

10. The process of claim 9 wherein the non-reactive environment comprises a vacuum.

11. The process of claim 9 wherein the non-reactive environment comprises an inert gas atmosphere.

* * * * *